US012674910B2

(12) United States Patent
Yu et al.

(10) Patent No.: US 12,674,910 B2
(45) Date of Patent: Jul. 7, 2026

(54) DEVICE AND METHOD FOR MONITORING AND EARLY WARNING INFORMATION PERCEPTION REGARDING URBAN YELLOW MUD

(71) Applicant: Soil and Water Conservation Monitoring Center of Pear River Basin, Pearl River Water Resources Commission of the Ministry of Water Resources, Guangzhou City (CN)

(72) Inventors: Shunchao Yu, Guangzhou City (CN); Xuebing Jiang, Guangzhou City (CN); Qingbin Pan, Guangzhou City (CN); Hao Li, Guangzhou City (CN); Jun Huang, Guangzhou City (CN); Juan Wang, Guangzhou City (CN); Le Li, Guangzhou City (CN); Liping Lin, Guangzhou City (CN); Guangyan Wu, Guangzhou City (CN); Xiaolin Liu, Guangzhou City (CN); Wenfeng Pan, Guangzhou City (CN); Xinyue Kou, Guangzhou City (CN); Bin Yin, Guangzhou City (CN); Zhou Xu, Guangzhou City (CN); Bin Liu, Guangzhou City (CN); Qing Liu, Guangzhou City (CN); Huiqiang Wang, Guangzhou City (CN)

(73) Assignee: Soil and Water Conservation Monitoring Center of Pearl River Basin, Pearl River Water Resources, Guangzhou City (CN)

( * ) Notice: Subject to any disclaimer, the term of this patent is extended or adjusted under 35 U.S.C. 154(b) by 296 days.

(21) Appl. No.: 18/611,876

(22) Filed: Mar. 21, 2024

(65) Prior Publication Data
US 2024/0319406 A1      Sep. 26, 2024

(30) Foreign Application Priority Data

Mar. 21, 2023    (CN) .......................... 202310284002.7

(51) Int. Cl.
*G01W 1/14* (2006.01)
*G01F 1/66* (2022.01)
*G01F 1/667* (2022.01)

(52) U.S. Cl.
CPC ............... *G01W 1/14* (2013.01); *G01F 1/662* (2013.01); *G01F 1/667* (2013.01)

(58) Field of Classification Search
CPC .......... G01W 1/00; G01W 1/08; G01W 1/10; G01W 1/16; G01W 1/02; G01W 1/04;
(Continued)

(56) References Cited

FOREIGN PATENT DOCUMENTS

CN        111439877 A  *  7/2020  ............. G01N 33/18
CN        111811977 A  *  10/2020  ............... G01F 1/00
(Continued)

*Primary Examiner* — Andre J Allen
(74) *Attorney, Agent, or Firm* — Bay State IP, LLC

(57) ABSTRACT

The present disclosure presents a device and method for monitoring and early warning of information perception regarding urban yellow mud water, featuring a rainfall collecting component, a video shooting component, a sediment content monitoring component, a water level monitoring component and a main controller. The video shooting component evaluates the long-term trend of yellow mud water production in a monitoring area by analyzing the color depth of captured water flow, sediment content in the pipeline's flow section, and meteorological rainfall data from the rainfall collecting component. Utilizing data on color, sediment content, flow section, and rainfall, this system achieves unsupervised real-time monitoring and precise early warning for yellow mud water. It provides a scientific basic for traceability, dynamic monitoring, and (Continued)

address challenges such as low measurement accuracy and omitted applicability found in existing methods.

6 Claims, 6 Drawing Sheets

(58) Field of Classification Search
CPC ... G01W 1/06; G01W 2001/003; G01W 1/12; G01W 1/17; G01W 1/18; G01W 2001/006; G01W 2203/00; G01W 2201/00; G01L 19/12; G01L 5/00; G01L 11/00; G01L 1/02; G01L 19/0007; G01L 19/0046; G01L 5/0052; G01L 9/0072; G01L 9/0032; G01L 1/142; G01L 11/008; G01L 13/025; G01L 13/026; G01L 19/003; G01L 19/0092; G01L 19/02; G01L 19/04; G01L 19/06; G01L 19/08; G01L 21/00; G01L 21/26; G01L 5/14; G01L 5/168; G01L 9/0013; G01L 9/0022; G01L 9/0029; G01L 9/0035; G01L 9/0042; G01L 9/0058; G01L 9/0082; G01L 9/0083; G01L 9/0085; G01L 9/08; G01L 9/10; G01L 9/125; G01L 19/083; G01L 23/26; G01L 7/00; G01L 9/0097; G01L 9/12

USPC .......................................... 73/170.16–170.32
See application file for complete search history.

(56) References Cited

FOREIGN PATENT DOCUMENTS

| CN | 112114002 A | * | 12/2020 | ............... G01N 1/14 |
|----|-------------|---|---------|--------------------------|
| CN | 117558105 B | * | 7/2024  | ............. G08B 31/00  |
| CN | 119000567 A | * | 11/2024 | ........... G01F 23/296   |
| CN | 118657409 B | * | 12/2024 | ............. G06Q 50/26  |
| CN | 120766049 A | * | 10/2025 | ............. G01N 21/55  |

* cited by examiner

23

DEVICE AND METHOD FOR MONITORING AND EARLY WARNING INFORMATION PERCEPTION REGARDING URBAN YELLOW MUD

CROSS-REFERENCE TO RELATED APPLICATION

This patent application claims the benefit and priority of Chinese Patent Application No. 202310284002.7 filed with the China National Intellectual Property Administration on Mar. 21, 2023, the disclosure of which is incorporated by reference herein in its entirety as part of the present application.

TECHNICAL FIELD

The present disclosure belongs to the technical field of urban soil and water conservation, and relates to a monitoring and early warning device of information perception of urban yellow mud water. Furthermore, the present disclosure describes a method for monitoring and early warning of information perception regarding urban yellow mud water.

BACKGROUND

In recent years, urban "yellow mud water" has emerged as an environmental concern attracting widespread societal attention and presenting new scientific challenges. Relevant researchers have carried out long-term research thereon. Existing methods for sediment monitoring primarily include isotope radiation, acoustic, vibration and optical methods. However, these techniques vary in technical maturity, safety, construction costs, and applicability, making it challenging to accurately measure mud and water mixtures. More precise monitoring is achievable through physical methods that involve sampling, drying and weighing. Yet, the complexity of sediment composition, sedimentation and adhesion characteristics, along with the environmental conditions at the monitoring site, make sampling non-representative, and sediment content results unrepresentative. Furthermore, a mature technology for defining the color "threshold" or standard definition of yellow mud water has yet to be established, resulting in a lack of accurate automatic monitoring and early warning device specifically for urban yellow mud water. Consequently, monitoring urban yellow mud water effectively remains a significant challenge.

SUMMARY

The purpose of the present disclosure is to provide a device for monitoring and early warning of information perception regarding urban yellow mud water. The device aims address the limitations of existing devices, which include low measurement accuracy and limited applicability, making them insufficient for meet business requirements.

The further purpose of the present disclosure is to provide a method for monitoring and early warning of information perception regarding urban yellow mud water.

A first technical scheme employed by the present disclosure is as follows. A device for monitoring and early warning of information perception regarding urban yellow mud water, comprising an L-shaped European-standard aluminum profile, wherein a longitudinal slide rail is arranged on a vertical section of the L-shaped European-standard aluminum profile, a slider is arranged on the slide rail, and a video shooting component is fixedly connected to the slider.

A middle part of a horizontal section of the L-shaped European-standard aluminum profile is fixedly connected with an ultrasonic level gauge using an ultrasonic level gauge fixing part; one end of the horizontal section, far from the vertical section, is fixedly connected with a short European-standard aluminum profile through a corner connector. A Z-shaped brush gear motor is fixedly connected to the short European-standard aluminum profile, with an output shaft end of the Z-shaped brush gear motor being horizontally arranged. A sediment content monitoring component is connected with the output shaft; the horizontal section of the L-shaped European-standard aluminum profile is also connected with a rainfall collection component. The rainfall collecting component, video shooting component, sediment content monitoring component, and ultrasonic level gauge b are each connected with a main controller, respectively.

The present disclosure further includes the following features.

The video shooting component comprises a steering gear connected to the slider, a camera is installed on a rotating shaft of the steering gear. The steering gear is linked to a stepping motor, which is fixed above the slide rail through a stepping motor connecting plate. The stepping motor is connected with a pulley, the steering gear is connected with the pulley through a belt. Both the steering gear and the stepping motor are electrically connected to the main controller, respectively.

The rainfall collecting component includes a rainfall bucket, which is connected with the horizontal section of the L-shaped European-standard aluminum profile through a rainfall bucket fixing part. The rainfall bucket is installed at the corner of the L-shaped European-standard aluminum profile. An ultrasonic level gauge a is mounted on the upper surface of rainfall bucket, while an electromagnetic valve is installed at the bottom. Both the ultrasonic level gauge a and the electromagnetic valve are electrically connected with the main controller.

The sediment content monitoring component includes a motor fixing plate, which is sleeved and fixed on the output shaft of the Z-shaped brush gear motor a. The motor fixing plate is provided with a Z-shaped brush gear motor b. The output shaft of the Z-shaped brush gear motor b faces downwards and is connected with an arc tee through a coupling. The arc tee is connected with an optical axis, and a turbidity sensor is mounted at a lower end of the optical axis. The coupling facilitates the rotation of the optical axis by 90 degrees.

The main controller includes:

a stepping motor driving module, designed to drive the stepping motor to rotate at specific angles to adjust the camera's height;

a steering gear driving module, which is configured to convert a rotation angle into a corresponding square wave pulse width to control the rotation angle of the steering gear;

a camera driving module, which is configured to drive the camera to collect image data as required;

a wireless communication module, which is configured to use dual modules, a 5G communication module and a Beidou communication module. It switches to Beidou satellite communication mode when 5G network signals are weak, ensuring stable communication with a server;

a brush motor driving module, which is configured to drive the brush motor, realize the forward and reverse rotation of the brush motor, and feed the driving current and position of the brush motor back;

a 485 driving module, which is configured to realize conversion and long-distance transmission of signals collected by the ultrasonic level gauge a, and acquire the height of the liquid level in the rainfall bucket;

a turbidity sensor driving module, which is configured to realize communication level conversion and communication protocol analysis of the turbidity sensor, and acquire a turbidity value of the water flow;

an electromagnetic valve driving module, which is configured to control ON/OFF of the electromagnetic valve and release rainwater collected in the rainfall bucket;

an obstacle avoiding module, which is configured to judge whether siltation occurs by monitoring the driving current of the brush motor in real time, and perform a corresponding obstacle avoiding operation;

an image recognition module, which is configured to recognize an RGB value in the collected image through the image recognition algorithm, and carry out calibration matching according to the stored RGB value of a GSB International standard color card to obtain a chromaticity value of a current water body;

a control module, which is configured to realize the normal operation and data management of each module as a control center of the whole device.

A second technical scheme proposed in this disclosure outlines a monitoring method for information perception regarding urban yellow water. The specific operation steps are as follows:

Step 1, installing the monitoring and early warning device at a levelling position of an outlet side wall or a ground surface of a drainage pipeline, ensuring the device is stably placed at a fixed monitoring position;

Step 2, in the case that a signal value collected by the turbidity sensor has an abnormal value which is larger than an accumulated average value, rotating the Z-shaped brush gear motor b directly connected with the optical axis above the turbidity sensor by 90 degrees. rotate the other Z-shaped brush gear motor a by a certain angle. The action causes any obstacles or sundries on the sensor to fall off. Then, return the system to its initial measurement position. This procedure facilitates an automatic cycle of measurement, self-inspection, and re-measurement by the device, thereby completing the measurement of a turbidity index value;

the number of sediment particles collected by the turbidity sensor in the area corresponding to the position where the flow section is represented as an optical signal value. the data collected is stored in the main controller. Subsequently, the main controller calculates the sediment content using the signal conversion module in the following manner:

$$CS = \frac{A(I_{s-1} + I_{s-2} + I_{s-3})}{3KI_0} \quad (1)$$

where $N_1$, $N_2$ and $N_3$ are the number of particles in unit solution measured within an effective range of the three turbidity sensors, where $N_2$ is a measured value of the turbidity sensor located in the middle;

K is a constant depending on the selection accuracy of the turbidity sensor;

$I_o$ is an incident light intensity; $I_{s-1}$, $I_{s-2}$, $I_{s-3}$ are scattered light intensities of three collecting points; that is, signal values transmitted and received by the turbidity sensor;

A is an instantaneous area of the flow section, which is a cross-sectional area of a pipeline in a full flow state;

Step 3, the camera adjusting the shooting angle position through the rotation of the steering gear, monitoring the change of the regional water body, and completing the image recognition and judgment within a predetermined time to acquire the water body color value $SZ_{(i)}$ in different time periods;

$$SZ = \{0,1,2\} \quad (2)$$

where 0 stands for light yellow, 1 stands for medium yellow, and 2 stands for dark yellow;

Step 4, installing a standard-size rainfall bucket, according to the regional characteristics, calculating the water level height $H_1$ in the bucket using an ultrasonic level gauge a installed on the surface of the rainfall bucket. convert tis measurement to the value of the rainfall intensity R over a unit time period. When the rainfall in the rainfall bucket is full, turning on an electromagnetic valve installed at the bottom. Immediately turn off the electromagnetic valve after the water is instantly discharged;

$$R = \frac{H_1}{T} \quad (3)$$

where $H_1$ is the rainfall, and Tis the corresponding rainfall duration;

Step 5, the ultrasonic level gauge b mainly monitoring the water level height of the flow section, and acquiring the flow value Q of the section through a water level lookup table;

a comprehensive early warning method is as follows:

a mathematical model relationship between P and $p_{(1)}$, $p_{(2)}$, $p_{(3)}$ and $p_{(4)}$ is established;

$$P = \alpha * p_{(1)} + \beta * p_{(2)} + \gamma * p_{(3)} + w * p_{(4)}$$

$$\alpha + \beta + \gamma + w = 1$$

where: $p_{(1)}$ is a color index value, that is, the normalized value of SZ; $\alpha$ is its corresponding weight coefficient;

$p_{(2)}$ is a sediment content index value, that is, the normalized value of CS; $\beta$ is its weight coefficient;

$p_{(3)}$ is the flow section index value, that is, the normalized value of Q; $\gamma$ is its weight coefficient;

$p_{(4)}$ is the rainfall intensity value, that is, the normalized value of R; w is its weight coefficient;

when $0 < P \leq 0.5$, the early warning level is mild, the indicator light is blue, and the buzzer does not give an alarm, when $0.5 < P \leq 0.8$, the early warning level is moderate, the indicator light is yellow, and the buzzer gives an alarm with short alarm sound;

when $0.8 < P \leq 1.0$, the early warning level is severe, the indicator light is red, and the buzzer gives an alarm with long alarm sound;

the buzzer is arranged on a main controller circuit board; the indicator light is arranged on a display screen of a monitoring and early warning platform.

The present disclosure has the following beneficial effects.

The present disclosure relates to a device for monitoring and early warning of information perception regarding urban yellow mud water. A supporting frame of the early warning device is constructed from European-standard aluminum profiles of varying lengths, primarily forming an L-shaped main structure. Three turbidity sensors are installed at different positions of an optical axis through arc tees. The whole device is divided into four parts, and a brand-new linkage collecting device, namely the device for monitoring and early warning of information perception regarding yellow mud water. This mechanism constitutes the sediment content monitoring component for the flow section, the water level monitoring component (namely the ultrasonic level gauge b), the rainfall collecting part, and the video shooting component. It covers four monitoring indexes: color, sediment content, flow rate of the flow section, and rainfall amount. The present disclosure achieves unsupervised real-time monitoring and precise early warning for yellow mud water. It provides a scientific basic for traceability, dynamic monitoring, and address challenges such as low measurement accuracy and omitted applicability found in existing methods. Moreover, it serves as an effective strategy for preventing and mitigating soil and water erosion in urban development and construction projects.

At the same time, the four components of the device can operate independently, offering ease of disassemble without impacting each other's functionality. The data collected by each component can significantly support the operational needs of related industries. The integration of flow section sediment content-water safety water environment, flow section flow rate-water resource management, regional rainfall intensity-hydrometeorology, lake color-river and lake management can provide important data support for urban water ecological management and yellow mud water monitoring and early warning traceability.

Figure 1:
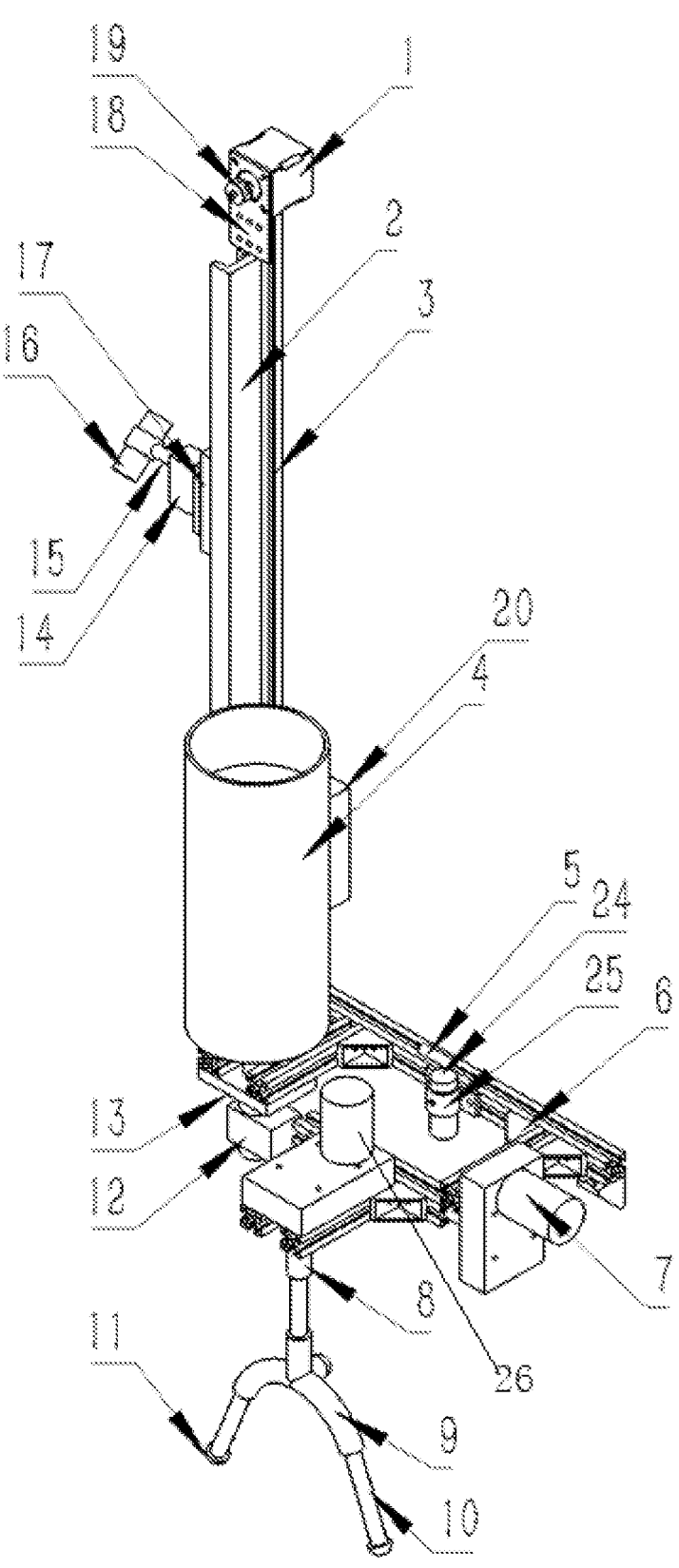
FIG. 1 is a schematic diagram of the overall structure of a device for monitoring and early warning of information perception regarding urban yellow mud water according to the present disclosure.
Figure 2:
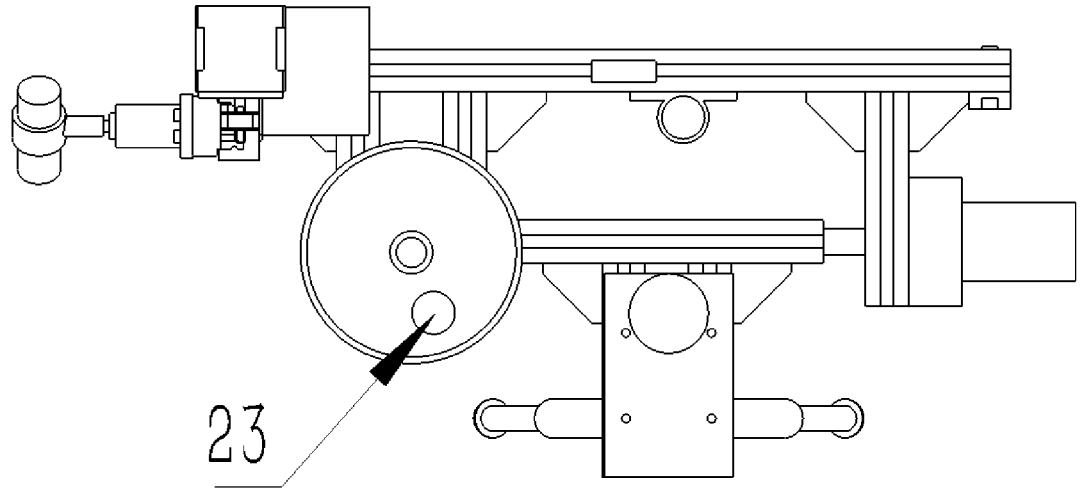
FIG. 2 is a top view of a device for monitoring and early warning of information perception regarding urban yellow mud water according to the present disclosure.
Figure 3:
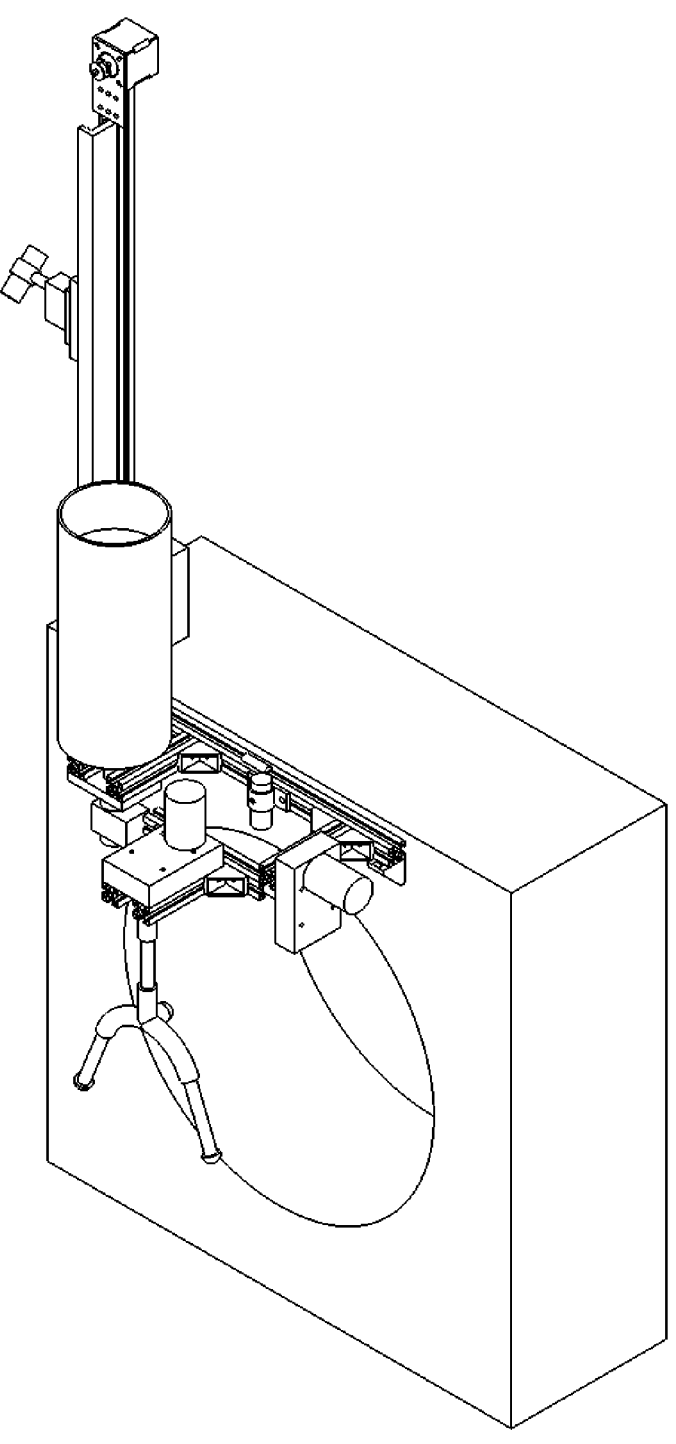
FIG. 3 is a structural diagram of the use state of a device for monitoring and early warning regarding information perception of urban yellow mud water according to the present disclosure.
Figure 4:
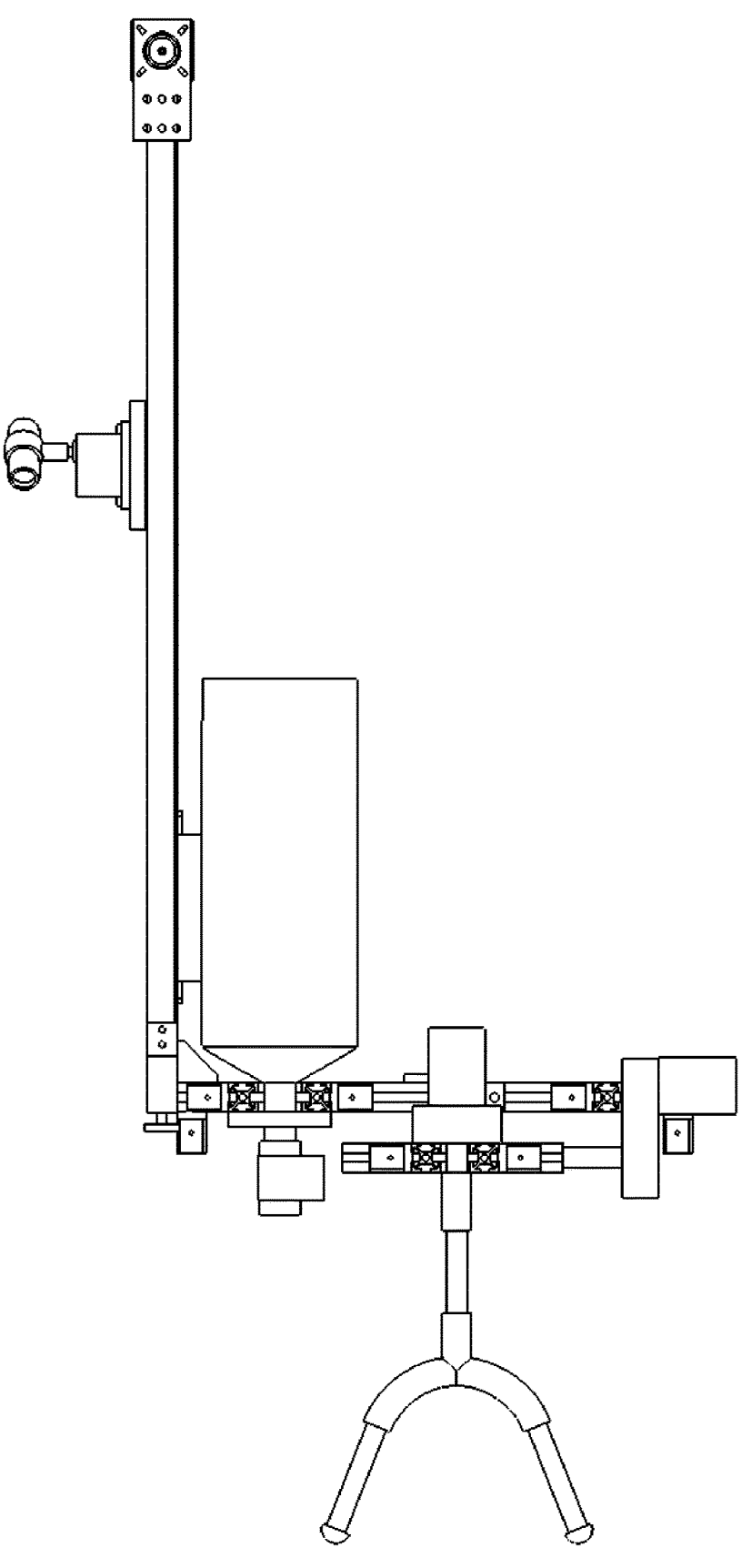
FIG. 4 is a side view of a device for monitoring and early warning of information perception regarding urban yellow mud water according to the present disclosure.

In the figures: 1. Stepping motor; 2. Slide rail; 3. L-shaped European-standard aluminum profile; 4. Rainfall bucket; 5. Long-level bubble; 6. Corner connector; 7. Z-shaped brush gear motor a; 8. Coupling; 9. Arc tee; 10. Optical axis; 11. Turbidity sensor; 12. Electromagnetic valve; 13. Rainfall bucket fixing part; 14. Steering gear; 15 Camera fixing part; 16. Camera; 17. Slider; 18. Stepping motor connecting plate; 19. Pulley; 20. Main controller; 21. Synchronous wheel fixing tensioner; 22. Synchronous wheel; 23. Ultrasonic level gauge a; 24. Ultrasonic level gauge b; 25. Ultrasonic level gauge fixing part; 26. Z-shaped brush gear motor b.

DETAILED DESCRIPTION OF THE EMBODIMENTS

The specific embodiments of the present disclosure will be described in further detail with reference to the accompanying drawings.

The device for monitoring and early warning of information perception regarding urban yellow mud water according to the present disclosure is shown in FIGS. 1 to 5. The device for monitoring and early warning regarding information perception of urban yellow mud water includes an L-shaped European-standard aluminum profile 3, wherein a longitudinal slide rail 2 is arranged on a vertical section of the L-shaped European-standard aluminum profile, a slider 17 is arranged on the slide rail 2, and a video shooting component is fixedly connected to the slider 17; and a middle part of a horizontal section of the L-shaped European-standard aluminum profile 3 is also provided with a long-level bubble 5.

The middle part of the horizontal section of the L-shaped European-standard aluminum profile is fixedly connected with an ultrasonic level gauge 24 using an ultrasonic level gauge fixing part 25; one end of the horizontal section far from the vertical section is fixedly connected with a short European-standard aluminum profile through a corner connector 6, a Z-shaped brush gear motor 7 is fixedly connected to the short European-standard aluminum profile, an output shaft end of the Z-shaped brush gear motor a7 is horizontally arranged, a sediment content monitoring component is connected with the output shaft; the horizontal section of the L-shaped European-standard aluminum profile 3 is further connected with a rainfall collection component; the rainfall collecting component, the video shooting component, the sediment content monitoring component and the ultrasonic level gauge b24 are each connected with a main controller 20, respectively.

The video shooting component includes a steering gear 14 connected to the slider 17 with a camera 16 installed on a rotating shaft of the steering gear 14, the steering gear 14 is linked to a stepping motor 1, which is fixed above the slide rail 2 through a stepping motor connecting plate 18, the stepping motor 1 is connected with a pulley 19, the steering gear 14 is connected with the pulley 19 through a belt, and both the steering gear 14 and the stepping motor 1 are electrically connected to the main controller 20, respectively; and the main controller 20 is electrically connected with the display screen of the monitoring and early warning platform.

The rainfall collecting component includes a rainfall bucket 4, which is connected with the horizontal section of the L-shaped European-standard aluminum profile 3 through a rainfall bucket fixing part 13, the rainfall bucket 4 is installed at the corner of the L-shaped European-standard aluminum profile; an ultrasonic level gauge a23 is mounted on an upper surface of the rainfall bucket 4 while an electromagnetic valve 12 is mounted at the bottom; and both the ultrasonic level gauge a23 and the electromagnetic valve 12 are electrically connected to the main controller 20.

The sediment content monitoring component includes a motor fixing plate which is sleeved and fixed on the output shaft of the Z-shaped brush gear motor a7, the motor fixing plate is provided with a Z-shaped brush gear motor b26, the output shaft of the Z-shaped brush gear motor b26 faces downwards and is connected with an arc tee 9 through a coupling 8, the arc tee 9 is connected with an optical axis 10, a turbidity sensor 11 is mounted at a lower end of the optical axis 10; and the coupling 8 facilitates the rotation of the optical axis 10 by 90 degrees.

Figure 6:
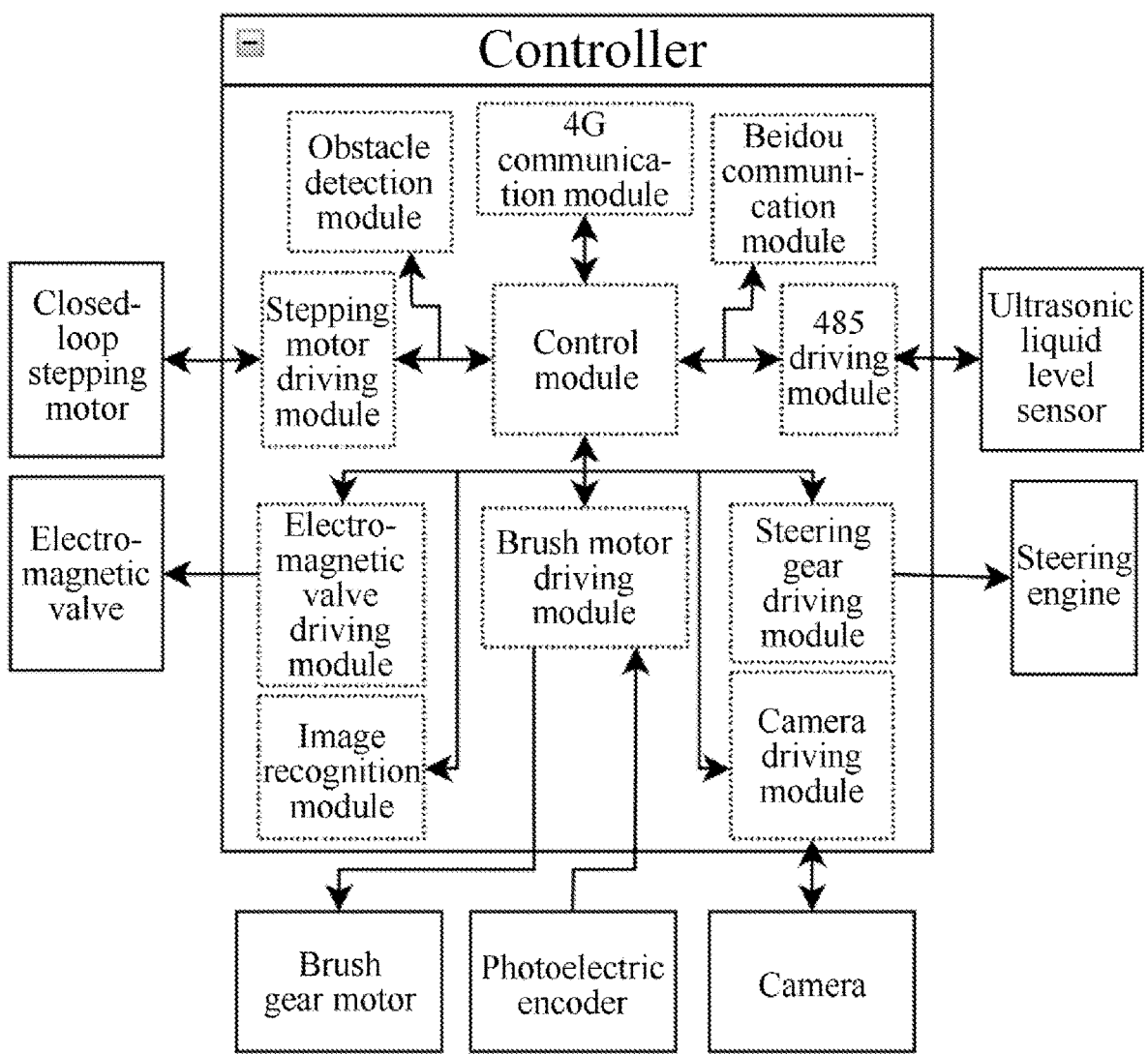
FIG. 6 is an electrical schematic diagram of a device for monitoring and early warning regarding information perception of urban yellow mud water according to the present disclosure.

As shown in FIG. 6, the main controller includes:

a stepping motor driving module, which is configured to drive the stepping motor to rotate at specific angles to adjust the camera's height;

a steering gear driving module, which is configured to convert a rotation angle into a corresponding square wave pulse width to control the rotation angle of the steering gear;

a camera driving module, which is configured to drive the camera to collect image data as required;

a wireless communication module, which is configured to use dual modules, a 5G communication module and a Beidou communication module, and switch to a Beidou satellite communication mode when 5G network signals are week, ensuring stable communication with a server;

a brush motor driving module, which is configured to drive the brush motor, realize the forward and reverse rotation of the brush motor, and feed the driving current and position of the brush motor back;

a 485 driving module, which is configured to realize conversion and long-distance transmission of signals collected by the ultrasonic level gauge a, and acquire the height of the liquid level in the rainfall bucket;

a turbidity sensor driving module, which is configured to realize communication level conversion and communication protocol analysis of the turbidity sensor, and acquire a turbidity value of the water flow;

an electromagnetic valve driving module, which is configured to control ON/OFF of the electromagnetic valve and release rainwater collected in the rainfall bucket;

an obstacle avoiding module, which is configured to judge whether siltation occurs by monitoring the driving current of the brush motor in real time, and perform a corresponding obstacle avoiding operation;

an image recognition module, which is configured to recognize an RGB value in the collected image through the image recognition algorithm, and carry out calibration matching according to the stored RGB value of a GSB International standard color card to obtain a chromaticity value of a current water body;

a control module, which is configured to realize the normal operation and data management of each module as a control center of the whole device.

The European-standard aluminum profile, the coupling, the optical axis, the slide rail and the rainfall bucket described in the specific embodiment of the present disclosure are made of stainless steel, and their sizes can be customized by those skilled in the art according to the position and size of the drainage pipeline during design and production.

The early warning device features a straightforward design and is easy to install. In operation, it is positioned on the surface of the outlet pipe wall or the leveled area of the drainage pipeline, where it is then leveled and fixed for measurement. The device's timeliness and measurement accuracy are as well-suited to support ongoing research efforts.

The structure of the monitoring and early warning device is both novel and unique. It achieves the monitoring and early warning for information perception through the intergration of multi-influence factors and use of an intelligent transmission device (Bluetooth), automating the entire process. Installation at the correct position on the drainage outlet and connection to a power source are all that is required to enable the monitoring and early warning capabilities for yellow mud water The device is simple in structure, low in power consumption, easy to carry and low in installation cost. It also supports wireless data transmission, making it highly adaptable for monitoring yellow mud water across various drainage pipeline systems. Furthermore it provides a solid technical and data basis for the prevention and control of "cross flow" of urban yellow mud water, as well as for water safety protection and water environment management and development.

Figure 5:
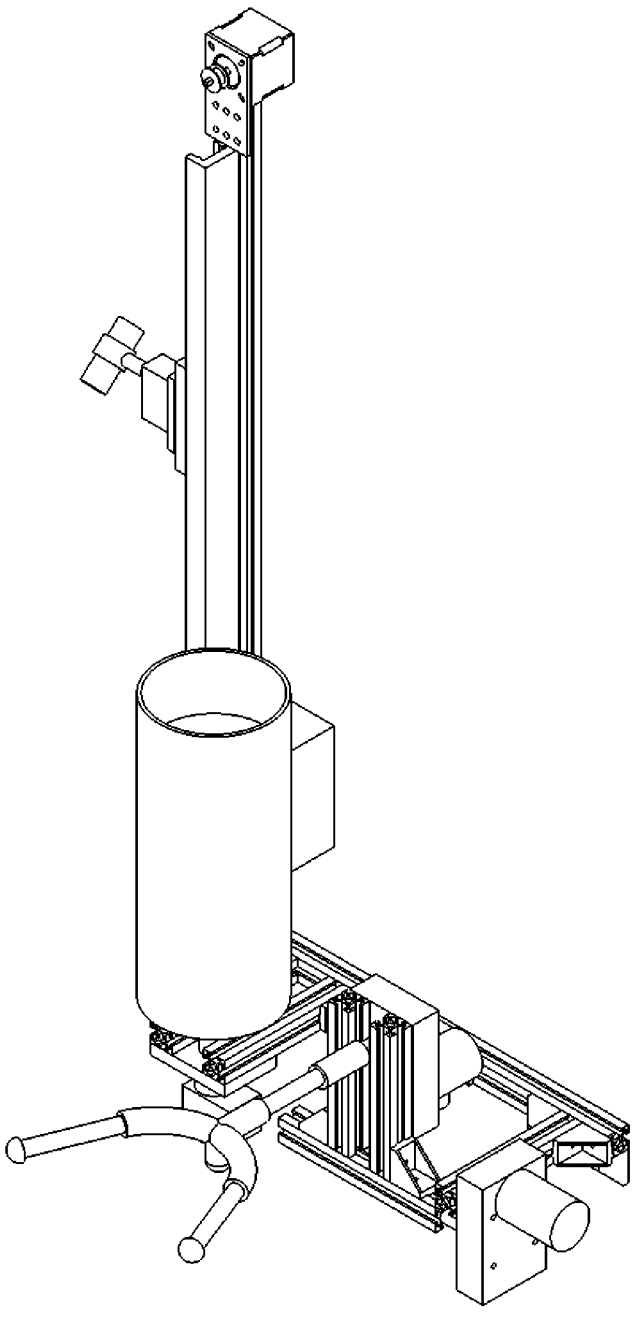
FIG. 5 is a state diagram of a device for monitoring and early warning of information perception regarding urban yellow mud water rotating by 90 degrees according to the present disclosure.

The present disclosure relates to a method for monitoring and early warning of information perception regarding urban yellow mud water, wherein the specific operation steps are as follows:

Step 1, installing the monitoring and early warning device at a level position on an outlet side wall or a ground surface of a drainage pipeline, ensuring the device is stably placed at a fixed monitoring position;

Step 2, in the case that a signal value collected by the turbidity sensor has an abnormal value which is larger than the previous moment, rotating the Z-shaped brush gear motor b directly connected with the optical axis above the turbidity sensor by 90 degrees, and rotating the other Z-shaped brush gear motor a by a certain angle, so that the whole sediment monitoring component is lifted by a certain angle (as shown in FIG. 5), and obstacles (weeds, etc.) on the turbidity sensor fall off, and then return to an initial measurement position, so as to realize the automatic process of measurement-self-inspection-measurement of the device and complete the measurement of a turbidity index value;

the number of sediment particles collected by the turbidity sensor in the area corresponding to the position where the flow section is represented as an optical signal value, the data collected is stored in the main controller, and the main controller calculates the sediment content using the signal conversion module in the following manner:

$$CS = \frac{A(I_{s-1} + I_{s-2} + I_{s-3})}{3KI_0} \tag{1}$$

where $N_1$, $N_2$ and $N_3$ are the number of particles in unit solution measured within an effective range of the three turbidity sensors, where $N_2$ is a measured value of the turbidity sensor located in the middle;

K is a constant depending on the selection accuracy of the turbidity sensor;

$I_o$ is an incident light intensity; $I_{s-1}$, $I_{s-2}$, $I_{s-3}$ are scattered light intensities of three collecting points; that is, signal values transmitted and received by the turbidity sensor;

A is an instantaneous area of the flow section (a cross-sectional area of a pipeline in a full flow state);

Step 3, the camera 16 adjusting the shooting angle position through the rotation of the steering gear 14, monitoring the change of the regional water body, and completing the image recognition and judgment within a predetermined time to acquire the water body color value $SZ_{(i)}$ in different time periods;

$$SZ = \{0,1,2\} \tag{2}$$

where 0 stands for light yellow, 1 stands for medium yellow, and 2 stands for dark yellow;

Step 4, taking the rainfall bucket 4 as the rainfall collector, installing a standard-size rainfall bucket according to the regional characteristics, calculating the water level height $H_1$ in the bucket using an ultrasonic level gauge a23 installed on the surface of the rainfall bucket, and converting the value of the rainfall intensity R over a unit time period, when the rainfall in the rainfall bucket is full, turning on an electromagnetic valve 12 installed at the bottom, and immediately turning off the electromagnetic valve after the water is instantly discharged (according to the ultrasonic level data);

$$R = \frac{H_1}{T} \qquad (3)$$

where $H_1$ is the rainfall, and T is the corresponding rainfall duration;

Step 5, the ultrasonic level gauge 24 mainly monitoring the water level height of the flow section, and acquiring the flow value Q of the section through a water level lookup table, which is mainly the monitoring value of the administrative department for many years.

A comprehensive early warning method is as follows:

a mathematical model relationship between P and $p_{(1)}$, $p_{(2)}$, $p_{(3)}$ and $p_{(4)}$ is established;

$$P = \alpha * p_{(1)} + \beta * p_{(2)} + \gamma * p_{(3)} + w * p_{(4)}$$

$$\alpha + \beta + \gamma + w = 1$$

where: $p_{(1)}$ is a color index value, that is, the normalized value of SZ; $\alpha$ is its corresponding weight coefficient; $p_{(2)}$ is a sediment content index value, that is, the normalized value of CS; $\beta$ is its weight coefficient; $p_{(3)}$ is the flow section index value, that is, the normalized value of Q; $\gamma$ is its weight coefficient; $p_{(4)}$ is the rainfall intensity value, that is, the normalized value of R; w is its weight coefficient;

Early Warning Reference Value:

| P-value | early warning level | indicator light | buzzer |
|---|---|---|---|
| $0 < P \le 0.5$ | mild | blue | no alarm |
| $0.5 < P \le 0.8$ | moderate | yellow | alarm (short) |
| $0.8 < P \le 1.0$ | severe | red | alarm (long) |

The buzzer is arranged on a main controller circuit board; the indicator light is arranged on a display screen of a monitoring and early warning platform.

In specific use, the device is easy to learn, suitable for non-professionals and easy to popularize.

The technical scheme of that present disclosure will be describe in detail with reference to embodiments hereinafter, but the protection scope of the present disclosure is not limit to the following embodiments.

The rainfall information of the rainfall bucket in the monitoring and early warning device is collected, that is, the water level height in the bucket is calculated using an ultrasonic level gauge a installed on the surface of the rainfall bucket: $H_1 = 30$ cm;

$$R = \frac{H_1}{T} = 8 \, \text{mm/min}$$

The video shooting component acquires the water body color value in different time periods: $SZ_{(i)} = 1$.

The number of sediment particles collected by the turbidity sensor in the area corresponding to the position where the flow section is represented as an optical signal value, the data collected is stored in the main controller, and the main controller calculates the sediment content using the signal conversion module in the following manner:

$$CS = \frac{A(I_{s-1} + I_{s-2} + I_{s-3})}{3KI_0} = 78.5 \, \text{g/L}$$

The ultrasonic level gauge b mainly monitors the water level height of the flow section, and acquires the flow value of the section through a water level lookup table: Q=2.12 $\text{m}^3/\text{s}$.

Finally, according to the calculation model in the scheme of the present disclosure, the calculated value is P=0.65. Finally, compared with the set threshold, it is moderate "yellow mud water", the end indicator light in the main controller turns yellow and the buzzer gives an alarm sound, and at the same time, sends the early warning data to relevant managers through Bluetooth.

About the design description of each module of the present disclosure:

(1) The reason for the formation of "yellow mud water" is the magnitude of external driving force rainfall, which directly determines the magnitude of runoff and is also one of the important factors affecting soil erosion. The rainwater collection module of this device uses meteorological rainfall data to predict the long-term trend of "yellow mud water" within the monitoring area. By accurately gauging rainfall intensity at the measurement points, it provides a robust scientific basis for the early warning method.

(2) Sediment content serves as a quantitative indicator of soil erosion, enabling precise calculation of sediment levels in the flow section of the pipeline. It is essential for accurately defining yellow mud water. This device carries out multi-point collection of sediment content to make the measured data more reliable and accurate.

(3) The flow of the drainage outlet of the rainwater pipe network, that is, the flow section, is a reflection of the pipeline flow capacity and the diachronic accumulated value, which is helpful to calculate and estimate its impact on the safety performance of the estuary or the pipeline. Under the condition of rainstorm, the diachronic accumulated amount of soil erosion and yellow mud water can directly endanger the river water ecological safety and destroy the biological habitat in water. The section flow is the key influence index supporting the monitoring and early warning model of yellow mud water.

(4) The video shooting component is a module for quantitatively collecting the color of yellow mud water. The characteristics of yellow mud water vary across different regions, with distinct regional features influencing its color intensity. Combined with the long-sequence monitoring of river courses, data and visual support can be directly and objectively provided for the yellow mud water calibration standard.

The present disclosure integrates four collecting components, and breaks through the convention. From the external driving force (rainfall condition) of the monitored object itself to the internal direct influencing factors (sediment content, cross-section flow, color) and the potential regional change conditions (river self-repair capability), the present disclosure can comprehensively provide quantitative indexes for the definition of yellow mud water, and establish early warning models and ranges of different conditions, so that the yellow mud water monitoring technology has standards to follow and a method to be referenced.

The basic principles, main features and advantages of the present disclosure have been described above. It should be understood by those skilled in the art that the present disclosure is not limited by the above-mentioned embodiments. The above-mentioned embodiments only describe the principles of the present disclosure. Without departing from the spirit and scope of the present disclosure, there will be various changes and improvements, which will fall within the claimed scope of the present disclosure, which is defined by the appended claims and their equivalents.

What is claimed is:

1. A device for monitoring and early warning of information perception regarding urban yellow mud water, comprising an L-shaped European-standard aluminum profile (3), wherein a longitudinal slide rail (2) is arranged on a vertical section of the L-shaped European-standard aluminum profile, a slider (17) is arranged on the slide rail (2), and a video shooting component is fixedly connected to the slider (17);

a middle part of a horizontal section of the L-shaped European-standard aluminum profile is fixedly connected with an ultrasonic level gauge (24) using an ultrasonic level gauge fixing part (25); one end of the horizontal section far from the vertical section is fixedly connected with a short European-standard aluminum profile through a corner connector (6), a Z-shaped brush gear motor (7) is fixedly connected to the short European-standard aluminum profile, an output shaft end of the Z-shaped brush gear motor (7) is horizontally arranged, a sediment content monitoring component is connected with the output shaft; the horizontal section of the L-shaped European-standard aluminum profile (3) is further connected with a rainfall collection component; the rainfall collecting component, the video shooting component, the sediment content monitoring component and the ultrasonic level gauge (24) are each connected with a main controller (20), respectively.

2. The device for monitoring and early warning of information perception regarding urban yellow mud water according to claim 1, wherein the video shooting component comprises a steering gear (14) connected to the slider (17) with a camera (16) installed on a rotating shaft of the steering gear (14), the steering gear (14) is linked to a stepping motor (1), which is fixed above the slide rail (2) through a stepping motor connecting plate (18), the stepping motor (1) is connected with a pulley (19), the steering gear (14) is connected with the pulley (19) through a belt, and both the steering gear (14) and the stepping motor (1) are electrically connected to the main controller (20), respectively.

3. The device for monitoring and early warning of information perception regarding urban yellow mud water according to claim 1, wherein the rainfall collecting component comprises a rainfall bucket (4), which is connected with the horizontal section of the L-shaped European-standard aluminum profile (3) through a rainfall bucket fixing part (13), the rainfall bucket (4) is installed at the corner of the L-shaped European-standard aluminum profile; an ultrasonic level gauge a(23) is mounted on an upper surface of the rainfall bucket (4) while an electromagnetic valve (12) is mounted at the bottom thereof; and both the ultrasonic level gauge (23) and the electromagnetic valve (12) are electrically connected to the main controller (20).

4. The device for monitoring and early warning of information perception regarding urban yellow mud water according to claim 1, wherein the sediment content monitoring component comprises a motor fixing plate which is sleeved and fixed on the output shaft of the Z-shaped brush gear motor (7), the motor fixing plate is provided with a Z-shaped brush gear motor b(26), the output shaft of the Z-shaped brush gear motor b(26) faces downwards and is connected with an arc tee (9) through a coupling (8), the arc tee (9) is connected with an optical axis (10), a turbidity sensor (11) is mounted a lower end of the optical axis (10); and the coupling (8) facilitates the rotation of the optical axis (10) 90 degrees.

5. The device for monitoring and early warning of information perception regarding urban yellow mud water according to claim 1, wherein the main controller comprises:

a stepping motor driving module, which is configured to drive the stepping motor to rotate at specific angles to adjust the camera's height;

a steering gear driving module, which is configured to convert a rotation angle into a corresponding square wave pulse width to control the rotation angle of the steering gear;

a camera driving module, which is configured to drive the camera to collect image data as required;

a wireless communication module, which is configured to use dual modules, a 5G communication module and a Beidou communication module, and switch to a Beidou satellite communication mode when 5G network signals are week, ensuring stable communication with a server;

a brush motor driving module, which is configured to drive the brush motor, realize the forward and reverse rotation of the brush motor, and feed the driving current and position of the brush motor back;

a 485 driving module, which is configured to realize conversion and long-distance transmission of signals collected by the ultrasonic level gauge a, and acquire the height of the liquid level in the rainfall bucket;

a turbidity sensor driving module, which is configured to realize communication level conversion and communication protocol analysis of the turbidity sensor, and acquire a turbidity value of the water flow;

an electromagnetic valve driving module, which is configured to control ON/OFF of the electromagnetic valve and release rainwater collected in the rainfall bucket;

an obstacle avoiding module, which is configured to judge whether siltation occurs by monitoring the driving current of the brush motor in real time, and perform a corresponding obstacle avoiding operation;

an image recognition module, which is configured to recognize an RGB value in the collected image through the image recognition algorithm, and carry out calibration matching according to the stored RGB value of a GSB International standard color card to obtain a chromaticity value of a current water body;

a control module, which is configured to realize the normal operation and data management of each module as a control center of the whole device.

6. A monitoring method of information perception regarding urban yellow mud water, which uses the monitoring and early warning device according to claim 1, wherein the specific operation steps are as follows:

Step 1, installing the monitoring and early warning device at a level position on an outlet side wall or a ground surface of a drainage pipeline, ensuring the device is stably placed at a fixed monitoring position;

Step 2, in the case that a signal value collected by the turbidity sensor has an abnormal value which is larger than an accumulated average value, rotating the Z-shaped brush gear motor (26) directly connected with the optical axis above the turbidity sensor by 90 degrees, and rotating the other Z-shaped brush gear motor (7) by a certain angle, that the action causes any obstacles or sundries on the sensor to fall off, return the system to its initial measurement position, this procedure facilitates an automatic cycle of measurement, self-inspection, and re-measurement by the device, thereby completing the measurement of a turbidity index value;

the number of sediment particles collected by the turbidity sensor in the area corresponding to the position where the flow section is represented as an optical signal value, the data collected is stored in the main controller, and the main controller calculates the sediment content using the signal conversion module in the following manner:

$$CS = \frac{A(I_{s-1} + I_{s-2} + I_{s-3})}{3KI_0} \tag{1}$$

where $N_1$, $N_2$ and $N_3$ are the number of particles in unit solution measured within an effective range of the three turbidity sensors, where $N_2$ is a measured value of the turbidity sensor located in the middle;

K is a constant depending on the selection accuracy of the turbidity sensor;

$I_o$ is an incident light intensity; $I_{s-1}$, $I_{s-2}$, $I_{s-3}$ are scattered light intensities of three collecting points; that is, signal values transmitted and received by the turbidity sensor;

A is an instantaneous area of the flow section, which is a cross-sectional area of a pipeline in a full flow state;

Step 3, the camera adjusting the shooting angle position through the rotation of the steering gear, monitoring the change of the regional water body, and completing the image recognition and judgment within a predetermined time to acquire the water body color value $SZ_{(i)}$ in different time periods;

$$SZ = \{0, 1, 2\} \tag{2}$$

where 0 stands for light yellow, 1 stands for medium yellow, and 2 stands for dark yellow;

Step 4, installing a standard-size rainfall bucket according to the regional characteristics, calculating the water level height $H_1$ in the bucket using an ultrasonic level gauge a installed on the surface of the rainfall bucket, and converting the value of the rainfall intensity R over a unit time period, when the rainfall in the rainfall bucket is full, turning on an electromagnetic valve installed at the bottom, and immediately turning off the electromagnetic valve after the water is instantly discharged;

$$R = \frac{H_1}{T} \tag{3}$$

where $H_1$ is the rainfall, and T is the corresponding rainfall duration;

Step 5, the ultrasonic level gauge b mainly monitoring the water level height of the flow section, and acquiring the flow value Q of the section through a water level lookup table;

a comprehensive early warning method is as follows:

a mathematical model relationship between P and $p_{(1)}$, $p_{(2)}$, $p_{(3)}$ and $p_{(4)}$ is established;

$$P = \alpha * p_{(1)} + \beta * p_{(2)} + \gamma * p_{(3)} + w * p_{(4)}$$

$$\alpha + \beta + \gamma + w = 1$$

where: $p_{(1)}$ is a color index value, that is, the normalized value of SZ; $\alpha$ is its corresponding weight coefficient;

$p_{(2)}$ is a sediment content index value, that is, the normalized value of CS; $\beta$ is its weight coefficient;

$p_{(3)}$ is the flow section index value, that is, the normalized value of Q; $\gamma$ is its weight coefficient;

$p_{(4)}$ is the rainfall intensity value, that is, the normalized value of R; w is its weight coefficient;

when $0 < P \leq 0.5$, the early warning level is mild, the indicator light is blue, and the buzzer does not give an alarm, when $0.5 < P \leq 0.8$, the early warning level is moderate, the indicator light is yellow, and the buzzer gives an alarm with short alarm sound;

when $0.8 < P \leq 1.0$, the early warning level is severe, the indicator light is red, and the buzzer gives an alarm with long alarm sound;

the buzzer is arranged on a main controller circuit board; the indicator light is arranged on a display screen of a monitoring and early warning platform.

* * * * *